T. M. BRESNAHAN.
AUTOMOBILE WINDOW ATTACHMENT.
APPLICATION FILED FEB. 27, 1920.
1,388,091.
Patented Aug. 16, 1921.
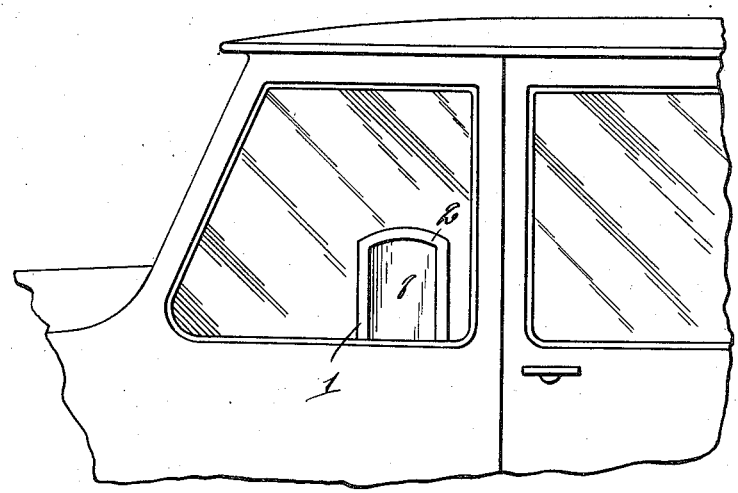
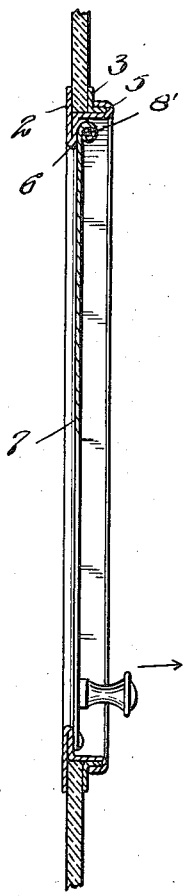
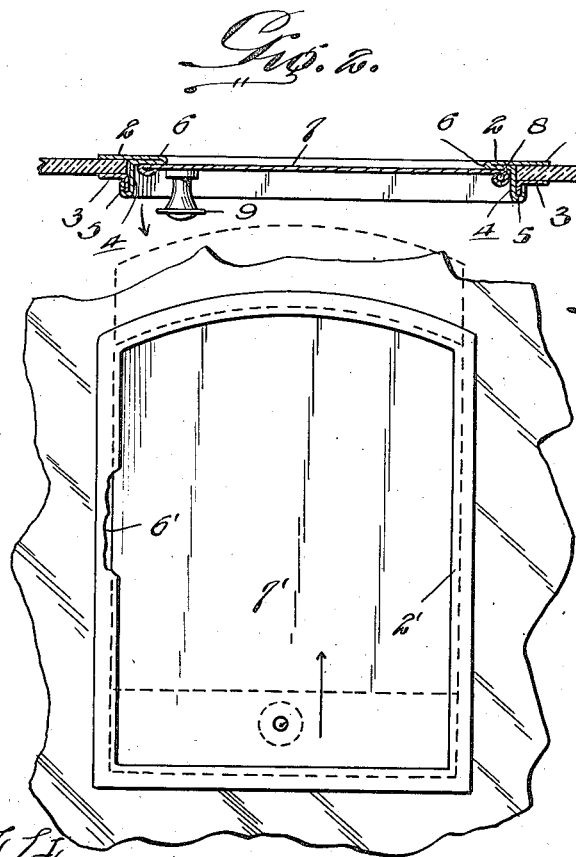
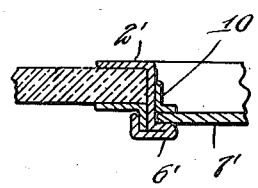
T. M. Bresnahan.
INVENTOR
BY Victor J. Evans.
ATTORNEY

UNITED STATES PATENT OFFICE.

THOMAS M. BRESNAHAN, OF WASHINGTON, DISTRICT OF COLUMBIA.

AUTOMOBILE-WINDOW ATTACHMENT.

1,388,091.                Specification of Letters Patent.    Patented Aug. 16, 1921.

Application filed February 27, 1920. Serial No. 361,850.

*To all whom it may concern:*

Be it known that I, THOMAS M. BRESNAHAN, a citizen of the United States, residing at Washington, District of Columbia, have invented new and useful Improvements in Automobile-Window Attachments, of which the following is a specification.

This invention relates to a door attachment for windows of automobiles, street cars, the ticket booths of moving pictures and similar places where it is desired to have access through the window, the principal object of the invention being to provide means whereby the door may be easily and quickly opened to project the hand in giving signals or in throwing objects, such as cigarette butts from the vehicle.

Another object of the invention is to provide means whereby a metal door frame may be secured to the glass of the window without using rivets or the like.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention in use on an automobile.

Fig. 2 is a cross section through the attachment shown in Fig. 1.

Fig. 3 is a view showing a modification.

Fig. 4 is a sectional detail of this modification.

Fig. 5 is a longitudinal sectional view of a further modification.

As shown in these views the attachment is carried by the glass or other transparent panel of the vehicle and in carrying out my invention I cut a hole in the glass, which is of the desired size and clamp the metal frame 1 to the walls of this opening. As shown in Figs. 1 and 2 this metal frame is formed of the two parts 2 and 3, the part 2 having a part engaging the outer face of the panel and the part 3 having a portion engaging the inner face thereof, the part 2 having its inwardly extending flange 4 bent over the inwardly extending flange 5 of the part 3 so as to clamp the frame to the panel. The part 2 is bent upon itself as at 6 and this portion 6 extends within the opening and forms a flange against which the door 7 rests when in closed position. This door 7 is hinged to one side of the frame by the rod 8 which engages openings in the lower and upper portions of the frame. The door is provided with a suitable knob 9.

It will thus be seen that when the device is used on an automobile the door may be used for projecting the hand to signal that the car is to stop or to make a turn. It may also be used for ejecting articles from the automobile and it may be used on street cars and the like for the same purpose. As before stated it may be used on the ticket booths of moving picture theaters and the like for selling tickets.

In the modification shown in Figs. 3 and 4 the door is moved vertically instead of being hinged at one side. In this form of the invention the frame has its flange 6' extending beyond the inner face of the panel and a small strip 10 is secured to the part 2' to form a guideway with said flange 6' in which the door 7' is adapted to be slid vertically. The door moves along the inner face of the panel.

In the modification shown in Fig. 5 the door is hinged at its upper edge as shown at 8'. In other respects this form is similar to that shown in Figs. 1 and 2.

As will be seen in all the forms the frame is clamped to the panel by the two parts of the frame being locked together so that the use of rivets and the like is rendered unnecessary. Thus the glass panel is not weakened by having holes bored therein to receive the rivets.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a transparent panel having an opening therein, a frame clamped to the edges of the panel around said opening, said frame consisting of two parts, each engaging a face of the panel and one part having a portion interlocking with the other part and a door associated with the frame for closing said opening.

In testimony whereof I affix my signature.

THOMAS M. BRESNAHAN.